Patented Apr. 19, 1932

1,854,460

UNITED STATES PATENT OFFICE

HENRY DREYFUS, OF LONDON, ENGLAND

TREATMENT OF MATERIALS MADE OF OR CONTAINING CELLULOSE DERIVATIVES

No Drawing. Application filed January 22, 1927, Serial No. 162,936, and in Great Britain November 23, 1926.

This invention relates to the dyeing, printing or stencilling of threads, yarns, knitted or woven fabrics, or other products made of or containing cellulose acetate or other organic acid esters of cellulose, such for example as cellulose formate, propionate or butyrate, or the product obtained by the treatment of alkalized cellulose with p-toluene sulpho-chloride (e. g. the product known as "immunized cotton"), or made of or containing cellulose ethers, such as methyl, ethyl or benzyl cellulose, or the corresponding condensation products of cellulose and glycols or other polyhydric alcohols, all of which cellulose derivatives are hereinafter referred to as organic substitution derivatives of cellulose.

According to the present invention materials made of or containing one or more of the said organic substitution derivatives of cellulose are dyed or otherwise colored with compounds in which an aryl dye nucleus contains either in the nucleus or as a substituent an amino or imino group or groups, one or more hydrogen atoms of which are replaced by an aliphatic side chain containing one, two, three or more hydroxy groups, i. e. the aryl dye nucleus is linked through nitrogen to one or more aliphatic groupings comprising one, two, three or more hydroxy groups.

Such compounds may readily be prepared, for example by interaction between an aryl dye nucleus containing an amino or imino group either in the nucleus or as substituent and a halohydrin, such for example as ethylene chlorhydrin, propylene chlorhydrins, glyceryl chlorhydrins, glyceryl dichlorhydrins, epichlorhydrin, chlorbutylene glycol, erythrol dichlorhydrin, mannitol mono- or dichlorhydrin and the like, or an alkylene oxide such as ethylene oxide or propylene oxide, or a carbohydrate such as glucose, lactose, galactose and the like, or other aliphatic hydroxy aldehydes or ketones, or an aliphatic hydroxy or polyhydroxy carboxylic acid. A second method of preparation of such dyestuffs consists in acting upon an aryl dye nucleus containing a phenolic or halogen group or groups with an amino-alcohol. Further, dyestuffs may be synthesized from components containing the substituted amino or imino groups.

The following examples of dyestuffs for use according to the present invention and of the methods of preparing them are intended to illustrate the invention and not to be in any way limitative.

A. Anthraquinone dyestuffs

*Example 1.*—1-hydroxy-4-aminoanthraquinone is reduced to the leuco state by treatment with caustic soda and sodium hydrosulphite and the leuco body precipitated by pouring into hydrochloric acid. The dried precipitate is refluxed on a water bath with β-aminoethyl alcohol and methylated spirits. The resulting leuco body is oxidized to yield a dyestuff of the formula

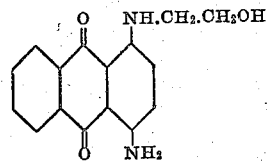

This compound dyes cellulose acetate artificial silk a blue violet.

*Example 2.*—α-chloranthraquinone is heated in an autoclave with β-aminoethyl alcohol and methylated spirits. The mass is allowed to cool, filtered and purified. The product

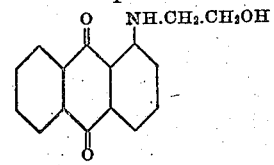

dyes a full shade of scarlet.

*Example 3.*—1.4-diaminoanthraquinone is warmed with twice its weight of ethylene oxide and with glacial acetic acid in presence of nitrobenzol and the product allowed to crystalize. Its formula is

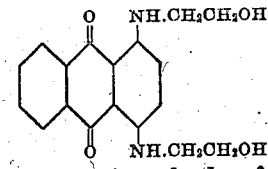

and it dyes a pleasing shade of blue.

*Example 4.*—1-amino-4-methoxyanthraquinone reacts with propylene oxide in a similar manner to yield a product giving bluish-red shades.

In a similar manner aminoanthraquinones or substitution products thereof may be condensed with chlorhydrins. In the case of using chlorhydrins containing two or more chlorine atoms such as glyceryl dichlorhydrin $CH_2Cl.CHOH.CH_2Cl$ or its isomer $$CH_2OH.CHCl.CH_2Cl$$

two or more molecules of the aminoanthraquinone may be condensed with one molecule of the chlorhydrin.

Further by employing suitable proportions of reagents the hydroxy-containing aliphatic side chain may be introduced into two or more amino groups attached to the same anthraquinone nucleus, or twice into the same amino group.

Again, dyestuffs may be prepared using hydrazinoanthraquinones instead of aminoanthraquinones. Thus 1-hydrazinoanthraquinone condensed with aliphatic hydroxy aldehydes or ketones, such for example as $\beta$-ketopropyl alcohol $CH_3.CO.CH_2OH$ or glycollic aldehyde $CH_2OH.CHO$, yields products which in general give yellow to orange or brown shades.

*Example 5.*—3.3'.dichloro-N-dihydro-1.2.-1'.2',anthraquinoneazine (known as indanthrene blue GCD) is condensed with excess of $\gamma$-amino-$\alpha$ $\beta$ dihydroxy-propane in presence of nitrobenzol. The resulting dyestuff having the formula

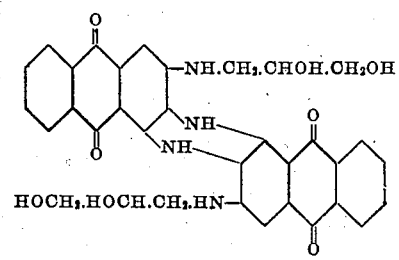

yields level blue shades.

*Example 6.*—Dibrombenzanthrone (obtained by brominating benzanthrone in glacial acetic acid solution) is brought to reaction with $\beta$-aminoethyl alcohol. The dyestuff obtained has the probable formula

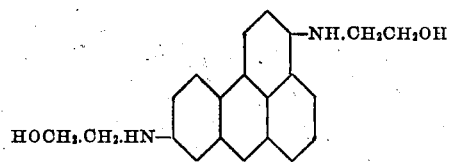

and gives yellow shades.

*Example 7.*—Anthrapyrimidone is treated with excess of ethylene chlorhydrin to give a dyestuff having the probable formula

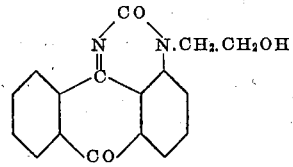

yielding yellow shades.

B. Indigoid dyestuffs

*Example 8.*—Hydroxyethylaniline-o-carboxylic acid is treated with chloracetic acid to produce N-hydroxyethyl-phenyl glycine-o-carboxylic acid, which is then fused with caustic alkali and the leuco compound oxidized to yield a dyestuff giving blue shades and having the probable formula

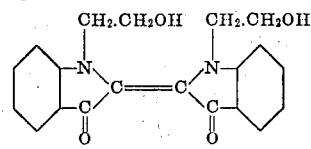

*Example 9.*—Dibromindigo is treated in an autoclave with excess of $\beta$-aminoethyl alcohol in presence of xylene to produce a blue dyestuff of the probable formula

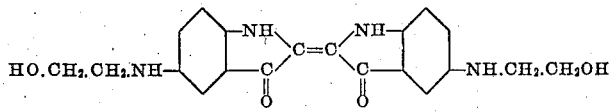

C. Miscellaneous dyestuffs

*Example 10.*—An aqueous alcoholic solution of diamino-dimethylacridone hydrochloride is heated under a reflux on a water bath with galactose until the resulting compound completely separates. The product may be purified by recrystallization from methyl alcohol. It dyes in somewhat greenish-yellow shades.

*Example 11.*—Nitrosodiethyl-m-aminophenol hydrochloride is heated with hydroxyethyl-$\alpha$-naphthylamine and alcohol on a water bath. On cooling the diethylamino-hydroxyethylamino-naphthophenazoxonium chloride separates in crystals. It yields greenish-blue shades.

In general the greater the number of hydroxy groups in the side chain or chains, the greater will be the solubility of the dyestuffs or compounds in water and for obvious reasons the use of such water soluble compounds is to be preferred.

The dyestuffs may be applied to the goods in solution (where they are sufficiently soluble), or in aqueous suspension or they may be brought into colloidal solution by any of the methods known in the art such as by grinding (for example in colloid mills), by dissolving in a solvent and pouring into water containing or not containing protective colloids, by pretreating with solubilizing agents, or by other methods. Of the solubilizing agents which are suitable for obtaining such dispersions I may mention those described in U. S. Patents 1,618,413, 1,618,414, 1,694,413 and 1,716,721 and application S. No. 134,138, viz. bodies of oily or fatty characteristics, namely higher fatty acids or sulphonated or other derivatives thereof containing salt-forming groups, such as sulphoricinoleic or other sulphonated fatty acids or salts of such acids or bodies, for instance their alkali or ammonium salts, used alone or in conjunction with auxiliary solvents as described in U. S. application S. No. 152,517 and U. S. Patent No. 1,690,481 of Nov. 6, 1928; carbocyclic compounds containing in their structure one or more salt-forming groups or salts of such compounds; sulpho-aromatic fatty acids or salts thereof; and soluble resin soaps or sodium or other soluble salts or soaps of resin acids.

The following are examples of methods of applying the dyestuffs of the present invention in solubilized form. They are purely illustrative and are not to be regarded as in any way limiting the invention.

*Example A.*—One pound of finely divided δ-(β-hydroxyethyl) aminoanthraquinone is stirred into 6 lbs. of 50% Turkey red oil and the paste heated to 70–80° C. with stirring till as homogenous as possible. The whole is now diluted with 10 gallons of boiling soft water, with stirring, and added through a filter cloth to a dyebath containing 300 gallons of water, in which are dissolved 1 lb. of olive oil soap and ¾ lb. of soda ash. 100 lbs. of cellulose acetate yarn in hank form, previously wetted out, are entered and the temperature raised during ¾ hour to 75–80° C. and maintained at this temperature for a further ¾ hour. The goods, which are now dyed a full scarlet shade, are lifted, rinsed well in soft water and dried or otherwise treated as desired.

*Example B.*—One pound of finely divided 1.4.di(β-hydroxyethylamino)-anthraquinone is stirred into 6lbs. of neutral 50% sulphonaphthalene ricinoleic acid (prepared by sulphonating a mixture of napthalene and castor oil). The whole is heated to 80° C. with stirring until as homogeneous as possible and is then diluted with 10 gallons of boiling water. This is added through a filter cloth to a dyebath containing 300 gallons of water in which have been dissolved 1½ lbs. of sulphonaphthalene ricinoleic acid. 100 lbs. of cellulose acetate yarn in hank form are now entered and the temperature raised during ¾ hour to 75–80° C. and maintained at this temperature for a further ¾ hour. The goods, now dyed a pure blue shade, are lifted, washed well in water and dried or otherwise treated as desired.

*Example C.*—One pound of finely powdered 1-hydroxy-4-(β-hydroxyethyl)-aminoanthraquinone is stirred into a mixture of ½ lb. of tetrachlorethane and 6 lbs. of 50% Turkey red oil. The mixture is heated to 80–85° C., with stirring, until as homogeneous as possible, diluted with 10 gallons of boiling soft water and added to a dyebath containing 300 gallons of soft water, in which are dissolved 1 lb. of olive oil soap and ¾ lb. of soda ash. Dyeing is conducted as in the previous examples. The goods are dyed a full bright violet.

*Example D.*—One pound of 1-amino-4-(β-hydroxyethyl) aminoanthraquinone is stirred into a mixture of ½ lb. of axylene and 6 lbs. of 50% Turkey red oil. The mixture is heated to 70–75° C. with stirring, diluted with 10 gallons of boiling soft water and the whole added to a dyebath containing 300 gallons of soft water in which are dissolved 1 lb. of olive oil soap and ¾ lb. of soda ash. Dyeing is carried out as in the previous examples. The goods are dyed a full blue-violet.

*Example E.*—To print a blue shade on cellulose acetate fabric, a printing paste is made up as follows:—

10 parts 1.4-di(β-hydroxyethylamino) anthraquinone 10% aqueous paste.
6 parts Turkey red oil 50%.
12 parts wheat starch.
72 parts water.

The paste is boiled until as homogeneous as possible and printed onto the fabric prepared by padding in a solution of aluminium acetate (15° Tw.). The print is steamed for 15 minutes in dry steam at 212–218° F., washed well and lightly soaped. It may now be dried or otherwise finished as required.

Though in the above description dyestuffs belonging to particular series have been given and further aliphatic side chains containing hydroxy only have been described, it is to be understood that the invention extends to the use of dyestuffs of any series and containing aliphatic side chains which in addition to one, two, three or more hydroxy groups may contain any other desired constituents.

The invention further comprises the dyeing or otherwise coloring of mixed goods comprising for example, in addition to one or more of the organic substitution derivatives, silk, wool, or cellulose fibres natural or artificial such as cotton or the cellulose type of artificial silk, in solid or contrasting shades according to the affinity of the non-ester and non-ether portion of the goods. The goods may be dyed with other dyestuffs for the non-ester and non-ether portion thereof either before, after or together with the dyestuffs of the present invention.

The term dyeing in the claims is to be understood to include printing and stencilling.

What I claim and desire to secure by Letters Patent is:—

1. Process for dyeing materials comprising organic substitution derivatives of cellulose, comprising dyeing the material with a compound containing an aliphatic side chain linked to an aryl dye nucleus through nitrogen, such aliphatic side chain containing at least two alcoholic groups.

2. Process for dyeing material comprising an organic substitution derivative of cellulose, comprising dyeing the material with a compound in which an aryl dye nucleus is linked through nitrogen to at least one glyceryl residue.

3. Process for dyeing material comprising an organic substitution derivative of cellulose, comprising dyeing the material with an aqueous solution of a compound in which an aryl dye nucleus is linked through nitrogen to at least one glyceryl residue.

4. Process for dyeing material comprising an organic substitution derivative of cellulose, comprising dyeing the material with an aqueous colloidal solution of a compound in which an aryl dye nucleus is linked through nitrogen to at least one glyceryl residue.

5. Process for dyeing material comprising an organic substitution derivative of cellulose, comprising dyeing the material with a compound in which an anthraquinone dye nucleus is linked through nitrogen to at least one aliphatic grouping comprising at least one hydroxy group.

6. Process for dyeing material comprising an organic substitution derivative of cellulose, comprising dyeing the material with a compound in which an anthraquinone dye nucleus is linked through nitrogen to at least one glyceryl residue.

7. Process for dyeing material comprising an organic substitution derivative of cellulose, comprising dyeing the material with an aqueous solution of a compound in which an anthraquinone dye nucleus is linked through nitrogen to at least one aliphatic grouping comprising at least one hydroxy group.

8. Process for dyeing material comprising an organic substitution derivative of cellulose, comprising dyeing the material with an aqueous solution of a compound in which an anthraquinone dye nucleus is linked through nitrogen to at least one glyceryl residue.

9. Process for dyeing material comprising an organic substitution derivative of cellulose, comprising dyeing the material with an aqueous colloidal solution of a compound in which an anthraquinone dye nucleus is linked through nitrogen to at least one aliphatic grouping comprising at least one hydroxy group.

10. Process for dyeing material comprising an organic substitution derivative of cellulose, comprising dyeing the material with an aqueous colloidal solution of a compound in which an anthraquinone dye nucleus is linked through nitrogen to at least one glyceryl residue.

11. Process for dyeing materials comprising cellulose acetate, comprising dyeing the material with a compound containing an aliphatic side chain linked to an aryl dye nucleus through nitrogen, such aliphatic side chain containing at least two alcoholic groups.

12. Process for dyeing material comprising cellulose acetate, comprising dyeing the material with a compound in which an aryl dye nucleus is linked through nitrogen to at least one glyceryl residue.

13. Process for dyeing material comprising cellulose acetate, comprising dyeing the material with an aqueous solution of a compound in which an aryl dye nucleus is linked through nitrogen to at least one glyceryl residue.

14. Process for dyeing material comprising cellulose acetate, comprising dyeing the material with an aqueous colloidal solution of a compound in which an aryl dye nucleus is linked through nitrogen to at least one glyceryl residue.

15. Process for dyeing material comprising cellulose acetate, comprising dyeing the material with a compound in which an anthraquinone dye nucleus is linked through nitrogen to at least one aliphatic grouping comprising at least one hydroxy group.

16. Process for dyeing material comprising cellulose acetate, comprising dyeing the material with a compound in which an anthraquinone dye nucleus is linked through nitrogen to at least one glyceryl residue.

17. Process for dyeing material comprising cellulose acetate, comprising dyeing the material with an aqueous solution of a compound in which an anthraquinone dye nucleus is linked through nitrogen to at least one aliphatic grouping comprising at least one hydroxy group.

18. Process for dyeing material comprising cellulose acetate, comprising dyeing the material with an aqueous solution of a compound in which an anthraquinone dye nucleus is linked through nitrogen to at least one glyceryl residue.

19. Process for dyeing material comprising cellulose acetate, comprising dyeing the material with an aqueous colloidal solution of a compound in which an anthraquinone dye nucleus is linked through nitrogen to at least one aliphatic grouping comprising at least one hydroxy group.

20. Process for dyeing material comprising cellulose acetate, comprising dyeing the material with an aqueous colloidal solution of a compound in which an anthraquinone dye nucleus is linked through nitrogen to at least one glyceryl residue.

21. Material comprising an organic substitution derivative of cellulose, dyed with a compound containing an aliphatic side chain linked to an aryl dye nucleus through nitrogen, such aliphatic side chain containing at least two alcoholic groups.

22. Material comprising an organic substitution derivative of cellulose, dyed with a compound in which an anthraquinone dye nucleus is linked through nitrogen to at least one aliphatic grouping comprising at least one hydroxy group.

23. Material comprising cellulose acetate dyed with a compound containing an aliphatic side chain linked to an aryl dye nucleus through nitrogen, such aliphatic side chain containing at least two alcoholic groups.

24. Material comprising cellulose acetate, dyed with a compound in which an anthraquinone dye nucleus is linked through nitrogen to at least one aliphatic grouping comprising at least one hydroxy group.

25. Process for dyeing material comprising cellulose acetate, comprising applying an amino anthraquinone containing hydroxy-ethyl groups attached to at least one amino group.

26. Process for dyeing material comprising cellulose acetate, comprising applying thereto an anthraquinone derivative containing at least one hydroxy-ethyl amino group and at least one hydroxy group.

27. Process for dyeing material comprising cellulose acetate, comprising applying thereto an anthraquinone derivative containing at least one hydroxy-ethyl amino group and at least one amino group.

28. Material comprising cellulose acetate colored with an amino anthraquinone containing hydroxy-ethyl groups attached to at least one amino group.

29. Material comprising cellulose acetate colored with an hydroxy-ethylamino hydroxy anthraquinone.

In testimony whereof I have hereunto subscribed my name.

HENRY DREYFUS.